United States Patent [19]

Blaine et al.

[11] Patent Number: 5,444,635

[45] Date of Patent: Aug. 22, 1995

[54] OPTIMIZING TECHNIQUE FOR SAWING LUMBER

[75] Inventors: George R. Blaine, Lake Stevens, Wash.; Robert T. Zwaard, Grand Prairie, Tex.

[73] Assignee: Alpine Engineered Products, Inc., Pompano Beach, Fla.

[21] Appl. No.: 118,796

[22] Filed: Sep. 8, 1993

[51] Int. Cl.6 .............................................. G08B 19/18
[52] U.S. Cl. .................. 364/474.13; 83/75.5; 364/474.09
[58] Field of Search ............. 364/474.13, 181, 474.09, 364/474.15, 474.16, 474.22–474.27; 83/71, 268, 468, 365, 364, 367; 143/47; 144/312, 356, 357; 250/563

[56] References Cited

U.S. PATENT DOCUMENTS

| | | | |
|---|---|---|---|
| 3,186,453 | 6/1965 | Green | 143/47 |
| 3,329,181 | 7/1967 | Buss et al. | 143/47 |
| 3,459,246 | 8/1969 | Ottosson | 144/312 |
| 3,736,968 | 6/1973 | Mason | 144/312 |
| 3,780,777 | 12/1973 | Davies | 144/3 N |
| 3,811,353 | 5/1974 | Miles | 83/71 |
| 3,941,019 | 3/1976 | Baldwin et al. | 83/71 |
| 4,596,172 | 6/1986 | Visser | 83/71 |
| 5,251,142 | 10/1993 | Crammer | 364/474.73 |

OTHER PUBLICATIONS

"Introducing the P.F. 90–I Computer Controlled I–Beam Cutting System", PF Cutting date unknown.
Operation Manual for PF90 Computer Controlled Saw, PF Cutting date unknown.

*Primary Examiner*—James P. Trammell
*Attorney, Agent, or Firm*—Richards, Medlock & Andrews

[57] ABSTRACT

An enhancement for use with a sawing system for allowing an operator to communicate with a computer control to more efficiently carry out the cutting operations in a manual manner. The enhancement of the invention computes optimized cuts, controls a stop block for use during the cutting operations, and detects manual strokes of the saw. The computer system interacts with the operator to prompt the operator to input defect-free lengths of the material and when to manually carry out the cutting operations, thereby providing an overall enhancement to the manual sawing system.

18 Claims, 3 Drawing Sheets

OPTIMIZING TECHNIQUE FOR SAWING LUMBER

TECHNICAL FIELD OF THE INVENTION

The present invention relates in general to methods and apparatus for optimizing the cutting of lumber to complete a cut list of different lengths, and more particularly relates to semiautomatic techniques for cutting lumber according to two or more cut lists.

BACKGROUND OF THE INVENTION

Significant advances have been made in the automation of systems for cutting lumber or other types of work pieces. One technique that has significantly automated the lumber processing industry has been the computerized control of sawing operations to optimize the use of an inventory of lumber to produce predefined lengths of boards according to a cut list. In other words, optimizing saw systems exist for allowing an operator to simply enter a cut list into the computerized saw system to define the number of different boards needed of various lengths. According to such systems, the operator simply retrieves standard lumber from an inventory, such as 12 foot lengths, marks the boundaries of defects in the lumber with a light-sensitive chalk, and places the board into the system. Such a system then automatically scans the lumber with a camera to detect the boundaries of the defects, then determines the various lengths of defect free or clear portions of the lumber. When such information is automatically entered into the computer of the saw system, the computer proceeds through an algorithm to determine the most efficient cuts that can be made of the clear portions of the lumber to satisfy one or more lengths required in the cut list, with minimum waste. The saw then automatically advances the lumber from an infeed station to the cutting station, whereupon the saw automatically cuts the lumber and advances it through the cutting system to remove the defects and achieve resulting board lengths that satisfy the cut list. Such a system is known as a PF90 cutting system, available from the assignee of the above-referenced patent application. The PF90 cutting system is capable of storing many cut lists for different application, but such a system cannot sequentially execute between two cut lists in the same operation.

While such types of systems are fully automated and highly advantageous in high volume applications, such systems are correspondingly more expensive than the traditional manual sawing systems where the operators are in full control of the decision making capabilities. There presently exist many manual sawing systems where the operator is aware of the different pieces of lumber needed according to a cut list, and the operator marks the lumber and manually carries out the cutting operation to satisfy the required pieces of lumber. While such systems are effective in achieving the desired result, they are labor intensive and not highly efficient.

Enhancements, in the nature of deployable stop blocks have been added to the manual systems in an attempt to increase the efficiency of the operator. In such enhanced systems, various stop blocks can be deployed in the path of the lumber as it is manually moved through a sawing station to automatically provide stop positions for board cuts to specific lengths. For example, four deployable stop blocks can be arranged downstream from the saw path, each being six inches apart and independently deployable, to provide board lengths of 36 inches, 42 inches, 48 inches and 54 inches. Such systems have undergone further refinements to provide a single stop block that is movable in a linear manner up and down the travel path of the lumber to achieve any desired board length, in increments such as 1/32 inch. In such type of semiautomatic systems, an operator can simply input via a keyboard, or otherwise, a specific length, whereupon the movable stop block is automatically and quickly moved to a specific distance from the cutting path of the saw blade.

From the foregoing, it can be seen that a need exists for further enhancements to manual or semiautomatic sawing systems to increase the efficiency thereof, while yet providing a cost effective cutting system. Yet another need exists for enhancements that can be retrofit to a manual or semiautomatic cutting system, to further enhance the cutting operations and increase the efficiency thereof.

SUMMARY OF THE INVENTION

In accordance with the present invention, the disclosed sawing system enhancement, and the method of operation thereof, substantially reduce or eliminate the disadvantages and shortcomings associated with the prior art techniques. According to one aspect of the invention, a program-controlled computer can be retrofit to a manual or semiautomatic cutting system to receive as an input thereto a cutting list and to control a movable stop block so that after an operator identifies the clear lengths of lumber and enters the same into the computer, the computer can optimize the cutting operation of the lumber by automatically moving the stop block. Once the computer has carried out the optimizing algorithm, the operator manually moves the lumber against the stop block, and manually moves the saw to make the cut. A switch detects the initiation of the saw stroke and couples a signal to the computer. The computer again causes the stop block to move so that another cut can be made in the clear section of the lumber.

If the board has two clear sections with a defect (a knot) between the clear sections, then the operator simply removes the knot and enters the length of the second clear section via a keypad connected to the computer. The computer then optimizes the cuts to be made out of the second clear section and the operations proceed as described above.

In accordance with another aspect of the invention, two or more cut lists can be entered into the computer by the operator and lumber can be cut by intermixing the two cut lists. For example, a first cut list may require defect free sections of a board, and a second cut list may only require that cut board lengths be clear or include only solid knots or other minor defects that do not substantially compromise the integrity of the board. When an operator has available lumber with no defects, the operator can select a first cut list and enter the length of the lumber, whereupon the computer controls the stop block to achieve board lengths satisfying the first cut list. When the operator has lumber with one or more minor defects, then the second cut list can be selected, and the computer will move the stop block to obtain board lengths from the lumber that satisfy the second cut list. Grading of the lumber can thus be achieved as between the cut lists.

As can be appreciated, the enhancement according to the invention can be easily retrofit to existing manual or semiautomatic sawing systems and achieve a substantial efficiency at a cost effective price. The invention need not be retrofit to existing systems, but can also be provided as a cost effective new sawing system.

BRIEF DESCRIPTION OF THE DRAWINGS

Further features and advantages will become apparent from the following and more particular description of the preferred embodiment of the invention, as illustrated in the accompanying drawings in which like reference characters generally refer to the same components or elements throughout the views, and in which.

DETAILED DESCRIPTION OF THE INVENTION

Figure 1:
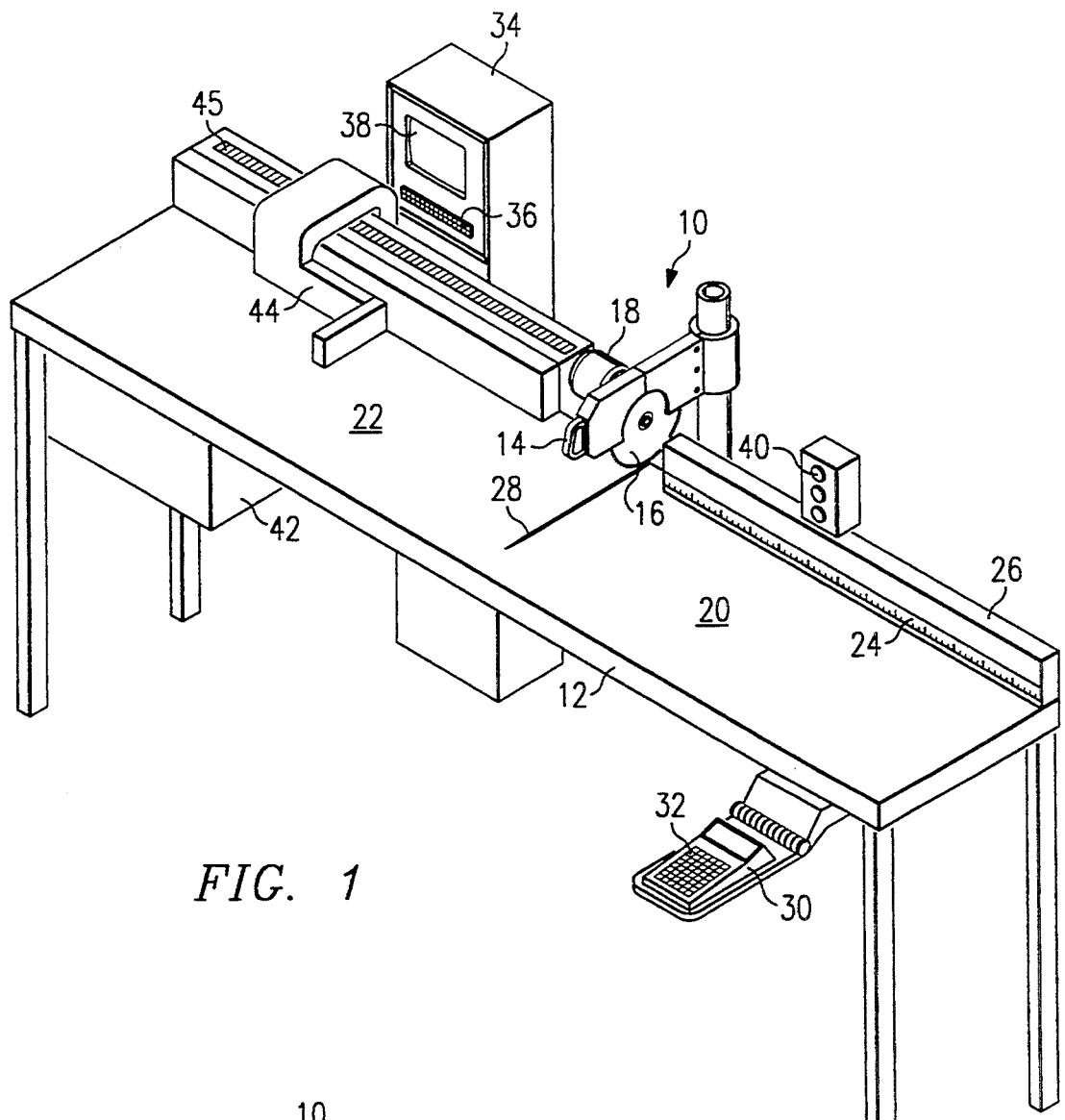
FIG. 1 is an isometric view of a sawing system according to the invention.

FIG. 1 illustrates a conventional, manual sawing system equipped with the enhancement according to the invention. A manually operable saw 10 of the radial arm type, is shown fixed with respect to a table or bench 12. The saw 10 includes a handle 14 that can be manually pulled to carry out a saw stroke and cut a length of lumber that is disposed on the table 12 in front of the saw 10. The saw 10 includes a blade 16 that is powered by an electric motor 18. Saws of the radial arm type are conventionally available, as are chop saws and undercut saws that can be utilized in the invention. The undercut saw is of the type that can be fastened under the worktable 12 and is movable upwardly to cut a length of lumber lying on the table. While the invention will be described in terms of a radial arm saw 10, many other types of saws will work with equal effectiveness.

The table 12 can be of any standard length for accommodating the length of lumber or articles to be cut. The table includes an infeed section 20 and an outfeed section 22, which sections will be described below. In accordance with the invention, an adhesive-backed measuring tape 24 is fastened to a fence line of the table 12 for measuring material to be cut. The tape measure 24 provides a measure with respect to a cutting path 28 of the saw blade 16 as it is manually moved across the table 12. Thus, an operator can simply place a piece of lumber on the infeed table 20 with one end aligned with the saw path 28, whereby the operator can determine the length of the clear portion of the lumber by reading such length on the tape measure 24.

Also shown in FIG. 1 is a keypad 30 having a number of keys 32, providing a mechanism for input of data or information into a computer 34. The keypad 30 is a standard 3×4 type of keypad associated with computer equipment. While not shown, the keypad 30 is connected by a multi-conductor cable to the computer 34. In the preferred embodiment of the invention, the computer is an IBM compatible computer with a 386-33 mHz processor. Preferably, the computer 34 is programmed so that the keys 32 of the keypad 30 have different functions according to different menus displayed on the CRT screen 38. The computer has a floppy disk drive 36, as well as a hard disk drive (not shown). Associated with the computer 34 is a CRT display 38 for providing visual prompts and other information to the operator. Three colored display lamps, one of which is shown as reference character 40, provide further status information to the operator of the cutting system. The yellow indicator lamp indicates that an input via the keypad 30 is required. The illumination of the green indicator indicates that a saw cut needs to be made. Lastly, the illumination of the red indicator means that an error has occurred, and the operator is to look at the CRT 38 in order to proceed. Those skilled in the art may find that lamps alone may provide appropriate visual prompts, without the use of a CRT.

A stop drive system 42 is associated with the outfeed 22 part of the cutting system. The stop drive system 42 is operative to drive a stop block 44 specified distances with respect to the saw path 28. Conventional stop drive systems are readily available for movably positioning a stop block 44 by way of screw drives, belts or chain drives. The stop block 44 is connected by a belt 45 to the motor controls in the stop drive system 42. Again, in the preferred form of the invention, a stepper motor is controlled by a number of pulses from the computer 34 for accurately placing the stop block 44 predefined distances with respect to the saw path 28. The stepper motor associated with the stop drive system 42 is connected to the computer 34 by a control cable (not shown) so that the computer can provide a predetermined number of pulses to the stepper motor, whereupon the stepper motor moves the stop block 44 a corresponding distance along the outfeed section 22 of the system. An angular encoder attached to the stepper motor verifies the position of the stop block 44.

Figure 2:
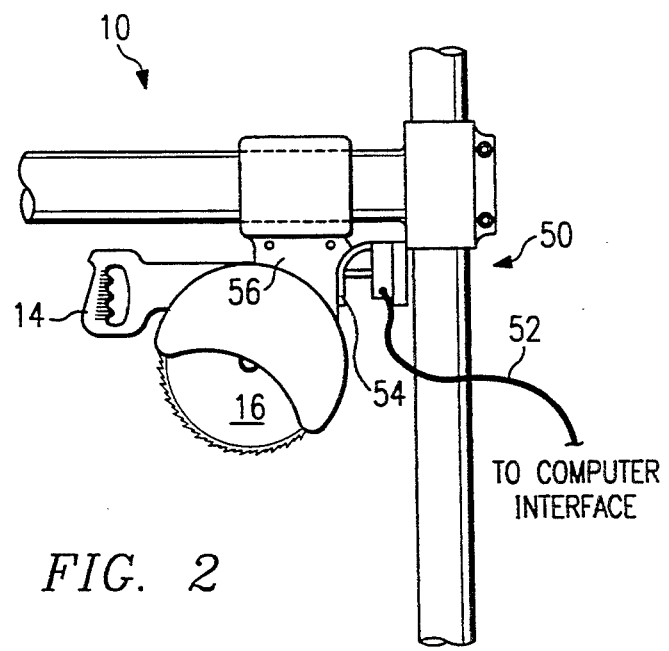
FIG. 2 is a side view of a portion of the sawing system, including a switch for detecting a saw stroke.

With reference now to FIG. 2, there is shown in more detail the radial arm saw 10, and a switch 50 for detecting the initiation of a saw stroke. The switch 50 is connected by a number of wires 52 to the computer 34 for providing signals thereto indicating that the operator has manually executed a saw stroke. The switch 50 is mounted or otherwise fixed to a stationary part of the saw 10. An actuation lever or arm 54 is engageable with a movable arm 56 of the radial arm saw 10. In the preferred form of the invention, the switch 50 is of a normally-closed type, where the contacts thereof are closed when the arm 56 of the saw engages the lever 54 of the switch 50. Thus, when the computer 34 monitors the contacts of the switch 50, via the wires 52, and detects a short circuit, the saw blade 16 is considered to be in a home position and ready to execute a cut. On the other hand, when the computer 34 finds that the contacts of the switch 50 are open circuited, the computer considers that the operator has moved the saw blade through a saw stroke.

In the operation of the enhanced sawing system of the invention, an operator is generally necessary in order to carry out various manual operations as well as provide and receive information with respect to the computer 34 to cut lumber or other work pieces and achieve different board lengths to satisfy a cut list. For example, in order to provide a sufficient number of boards to make a specified number of window frames, for example, the following would be required:

TABLE

| Number | Length | Grade |
|---|---|---|
| 50 | 48" | 1 |
| 50 | 7'0" | 1 |
| 50 | 3'0" | 2 |

TABLE-continued

| Number | Length | Grade |
| --- | --- | --- |
| 50 | 6'6" | 2 |

The grade 1 pieces would, for example, be a facia grade, meaning that the wood should be without visual defects. A grade 2 piece could have visual defects, such as knots or checks, but should otherwise be solid and not loose. The grade 2 piece of wood could preferably be used for a part of the window that would be vinyl covered so that the visual defects would not be important. Other defects which compromise the structural integrity of the wood, such as loose knots, would be unacceptable, and must be removed.

Initially, the operator can be provided with a cut list programmed on a floppy disk which can be inserted into the computer 34. Alternatively, the number of pieces and lengths thereof can be entered by the operator via the keypad 30. In operating the enhanced sawing system of the invention, the operator must have available an inventory of lumber, the lengths of which could be clear of defects, could have some defects that would correspond to a grade 2, and may also have defects that cannot be used and thus must be removed. The operation according to the invention is shown more fully in the flow charts of FIGS. 3a and 3b. These figures illustrate in flow chart form, the programmed instructions carried out by the computer 34 in response to the various inputs thereto. It should be noted that the computer 34 is interrupt driven based on the various inputs. For example, the inputs by the operator via the keypad 30 and stop block stepper motor encoder output pulses interrupt the processor of the computer, as does the saw stroke switch 50. The outputs of the computer comprise primarily the CRT 38, the colored indicator lamps 40 and the pulses which drive the stop drive system 42.

Figure 3A:
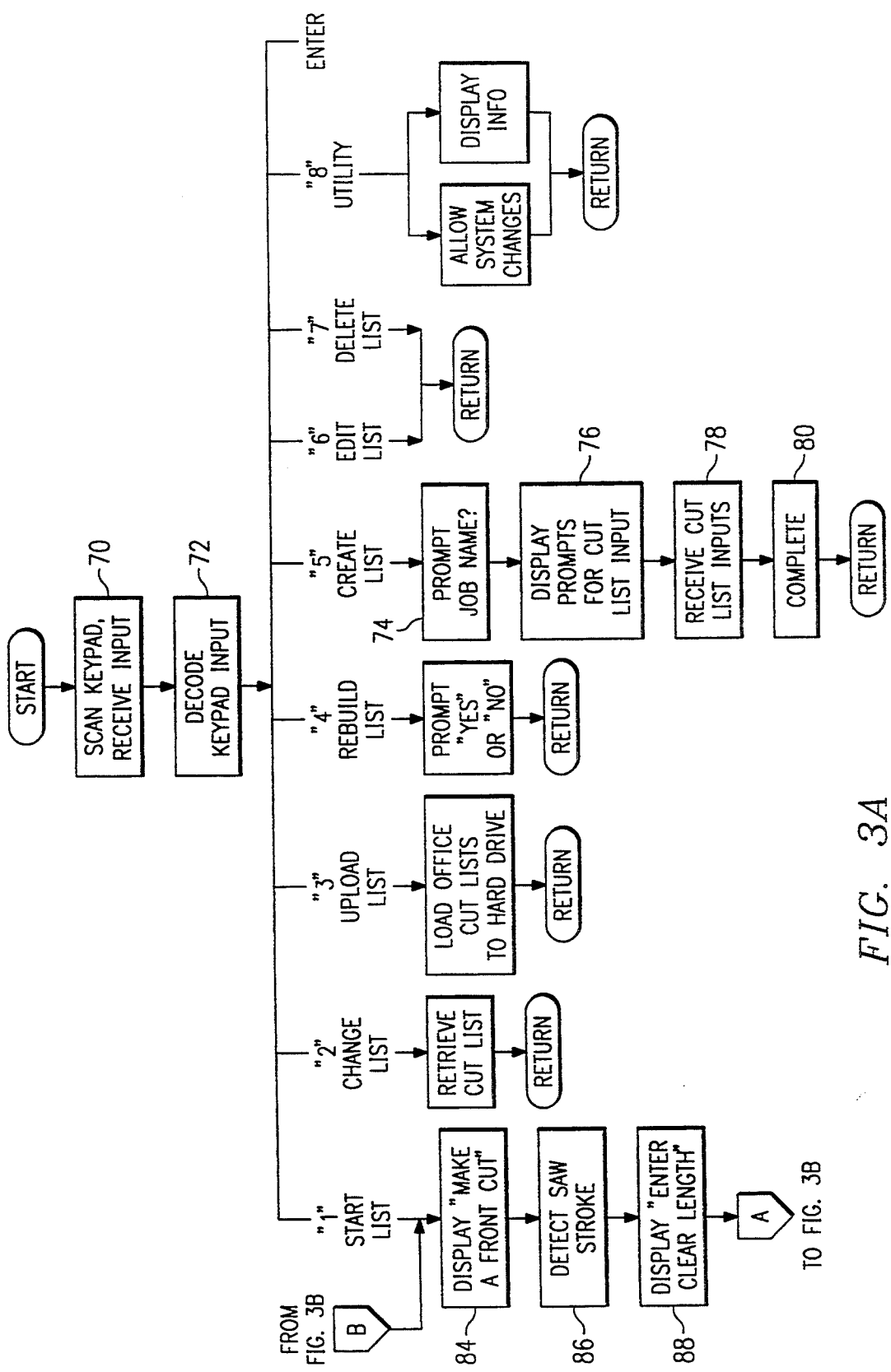
FIGS. 3a and 3b are flow charts describing the general operation of the computerized system.
Figure 3B:
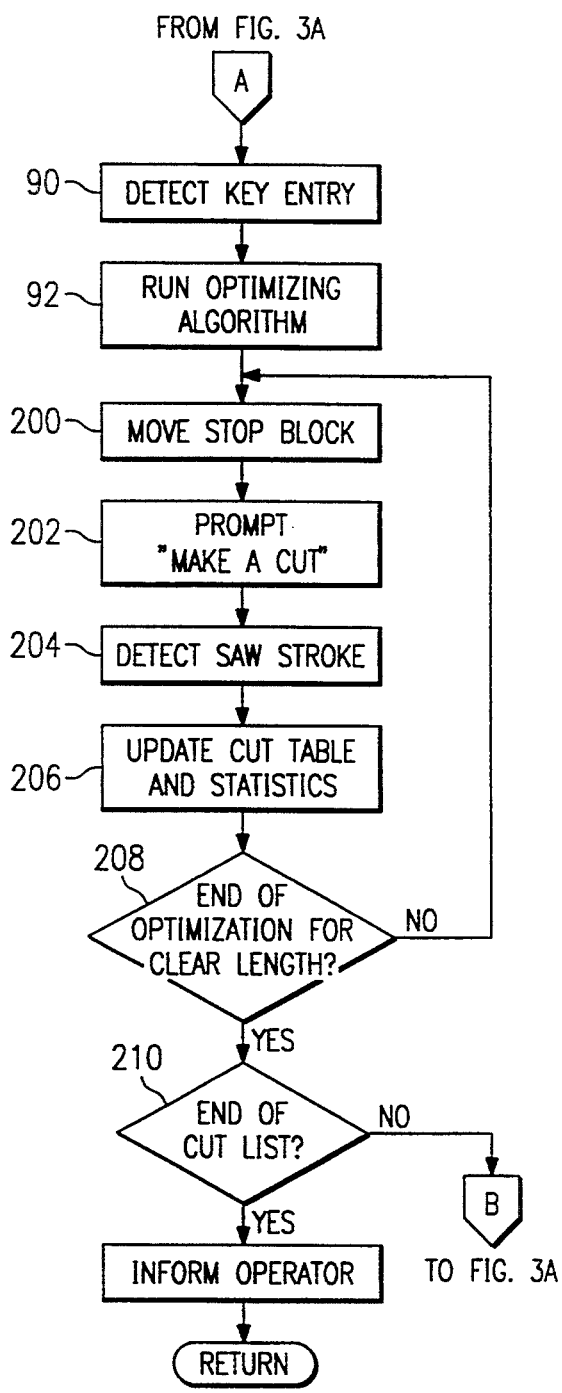

With respect to FIG. 3a, the computer 34 scans the keypad 30 to determine if any key is depressed. This is shown as program block 70. Program block 72 illustrates the detection of the operation of a key on the keypad 30, and the decoding of the same to determine which key was activated. As noted above, the keys 32 of the keypad 30 can assume many different functions, depending upon the menu or mode of operation in which the computer 34 is presently operating. When in an input mode, the keys 1–8 provide computer inputs as noted FIG. 3a. By depressing the "1" key, this indicates to the computer 34 an indication of a "start list" where the actual cutting of a board is to be carried out. During cutting, the computer 34 monitors any error and can provide a CRT indication thereof. The depression of the key "2" indicates a "change list" where the operator can change to another cut list. The key depression of "3" provides an indication of "upload list", which is effective to cause the computer to copy any cut list from the floppy disk to the computer hard disk. The depression of the "4" key provides an indication of "rebuild list" which transfers a cut list to its original state so that the job can be recut or carried out again. The depression of the "5" key corresponds to a "create list" function, allowing the operator to enter a cut list and to save the same on the hard disk drive of the computer 34. The "change list" command can be utilized to activate the cut list created. The key "6" indicates an "edit list" that allows the operator to edit any or all items in a previously established cut list. The "7" key of the keypad 30 indicates a "delete list", which allows an operator to delete an existing cut list from the hard disk of the computer 34. Lastly, the key "8" is a "utility" function where a set up status, of the system can be changed, statistics can be viewed on the CRT 38, various help files and prompts can be read, graphical information concerning quantities of cut boards can be viewed, and various active cut lists can also be reviewed.

Returning to the example of FIG. 3a, if the operator depresses the "5" key of keypad 30, the computer will execute instructions corresponding to program flow block 74. A prompt will appear on the CRT 38, urging the operator to enter a job name for a cut list. Once this has been input by the operator, the computer 34 further displays a prompt for inputting a cut list and the various parameters, such as number of boards and the lengths thereof for that cut list. This is shown in program flow block 76. In program flow block 78, the computer 34 receives the cut list data input by the operator, via the keypad 30. Once the cut list is complete 80, the computer 34 returns to normal processing.

In the event the operator then wants to cut an inventory of boards according to a cut list, the operator can then enter the "1" by way of the keyboard 30. The computer 34 provides to the operator a display prompt "make a front cut", as shown by program flow block 84. In response to this computer prompt, the operator retrieves a first piece of lumber from the inventory, places it on the infeed side 20 and makes a trim cut at the end of the lumber to square it and otherwise make a clean cut through the wood at the end of the lumber. The computer 34 detects the saw stroke by noting the opening of the switch 50 (FIG. 2) as noted by program flow block 86. After completion of the saw stroke, the computer 34 displays on the CRT 38 the prompt "enter clear length." Program flow block 88 illustrates these programmed operations. This prompt is an indication to the operator to leave the board where it is, one end aligned with the saw path 28, and visually gauge the first defect (proceeding to the right of the freshly cut end) to determine the distance from such end of the first defect that must be removed. The distance is gauged by looking at the tape measure 24 fixed to the fence line 26. If the first defect is located, for example 32 inches from the left-most edge of the lumber, the operator enters such digits by way of the keypad 30. This is shown by program flow block 90 of FIG. 3b. If the lumber is entirely defect free, then the whole length of the lumber is entered into the computer 34 via the keyboard 30. Once the computer 34 has received the input of the length of the defect-free portion of the lumber, it automatically runs an optimizing algorithm, as shown by program flow block 92. The optimizing program flow block 92 utilizes the cut list as the parameters to be satisfied and utilizes the defect-free length of the board to determine how to best utilize such length to cut therefrom one or more pieces to satisfy the cut list.

The computer 34 is programmed to carry out various optimization techniques, as selected by the operator. A maximum yield optimization mode is selectable by the operator, via the keypad 30. In the maximum yield mode, the computer 34 will select the cutting pattern that produces the least leftover. This mode usually results in an excess number of shorter lengths being cut. Hence, the maximum yield mode can be utilized for very small cut lists or where the quantities cut are not important.

In a maximum value mode, the computer 34 generates a cutting pattern from the clear length that is similar to the maximum yield mode, except the cut pattern is picked by the total pattern value, not by least leftover. This mode is handy for forced cutting of specific lengths or for cutting maximum clear lengths of the board, as determined by the operator. The value of a piece is initially set by the operator when a cut list is created, but can be changed using the edit list.

A quantity yield mode is also available and selectable by the operator. The quantity yield mode is used most often by an operator to control the quantity of cut pieces being produced. The original quantity for each length of a piece is entered into the computer 34, and is utilized to determine a ratio in which each length should be produced. For example, if twenty 12-inch pieces and forty 14-inch pieces are entered into the cut list, then when ten 12-inch pieces have been cut, there should also be about twenty 14-inch pieces cut. This mode produces results that closely match the quantity specified in the cut list.

A quantity value mode is also selectable for cutting according to a cut list. This mode is identical to the priority yield, except that the solution found is by total pattern value and not by least leftover. This mode allows the most control of the output of the optimizing software. Trial and error may be used in this mode to determine the best results.

In the quantity type modes identified above, the computer 34 will ascertain the ratios of all the pieces cut, to the original quantities entered by the operator as a cut list. From there, lengths whose quantities cut are greater than a certain amount, will not be considered for this pass. Optimization takes place using items that were considered during optimization. If the pattern result yields less leftover than the variable maximum leftover, that pattern is chosen. If not, re-optimization takes place by adding the percent (retry-percentage) to all pieces that were not previously considered. Some items will be considered allowing the optimizer a better choice from which to choose. The max-left over check is then reapplied. If the pattern yield is better this time, the pattern is chosen. Otherwise the maximum yield mode is used as a last resort. The quantity yield and the quantity values work substantially in the same manner, but the pattern is chosen by the pattern value, rather than yield. In the maximum modes, no ratios are utilized.

Once the computer has completed optimization, which may take 2-3 seconds per clear length of the lumber, it has determined how many cuts to make in the defect free portion, and the exact length of the boards between the cuts. For example, if the defect free portion is 85 inches long, it may make a single cut resulting in a 48-inch length board and a 36-inch length board, with one inch of waste left over. The width of the saw kerf is also considered by the computer in determining the boards to be cut from a clear length.

In accordance with program flow block 200, and in accordance with the table shown above, the computer 34 will cause the stop drive system 42 to move the stop block 44 a distance exactly 48 inches from the saw path 28. The computer 34 then carries out instructions pursuant to program flow block 202 to prompt the operator to "make a cut." The operator then moves the lumber against the stop block 44 and manually pulls the saw 10 across the board, thereby producing a first board 48 inches in length. According to program flow block 204, the computer 34 detects the saw stroke and updates a cut table and statistics as shown in block 206. In updating the cut table, the computer will note that one 48-inch length board has been cut and that only forty-nine more boards of such length are still required. The computer 34 then encounters a decision block 208 and determines if further optimization for the remaining clear length is required. In the example, a 36-inch piece of lumber can still be cut from the remaining clear length, whereby the computer 34 proceeds back to program flow block 200 and the stop block 44 is moved a distance 36 inches from the saw path 28. In response to the prompt on the CRT 38, the operator executes another saw stroke to make the 36-inch piece. The computer 34 then updates the statistics and cut table according to program flow block 206 to indicate that one 36-inch piece has been produced and that one inch of waste has resulted. The computer 34 exits the decision block 208 if there are no further pieces to be cut from the clear length of lumber.

In decision block 210, the computer determines if the cut list has been completely satisfied. If it has, the computer informs the operator and exits the decision block 210 and returns to regular processing. On the other hand, and in accordance with the example, if further pieces are required to complete cut list shown in the table, the computer 34 returns to program flow block 84 and prompts the operator to make a trim cut, e.g., to cut the knot out of the lumber. The operator is prompted to enter another clear length of the remainder of a piece of lumber being processed. Because the knot is now at the left end of the lumber being processed according to the example, the operator simply orients the board in front of the saw 10 to cut away the knot. The operator again gauges the clear length of the remainder of the piece of lumber with respect to the tape measure 24 and enters the dimension via the keyboard 30. This procedure is continued in the described manner by continually utilizing the lumber inventory, entering clear lengths, and executing cuts until the cut list has been fully satisfied. If there exists lengths of defect free number that cannot be utilized according to the cut list, the computer prompts the operator with a display "no solution." The computer 34 can be programmed to save these board lengths as leftover for statistical purposes, or disregard the same. The operator can then discard such length and proceed with a longer length of defect free lumber in an attempt to satisfy lengths of boards in the cut list.

In accordance with another feature of the invention, the operator can cut pieces of lumber in accordance with two or more cut lists stored in the computer 34. For example, if the operator determines that a defect in the board constitutes a grade 2, then the operator need only proceed in a manner shown in FIG. 4.

Figure 4:
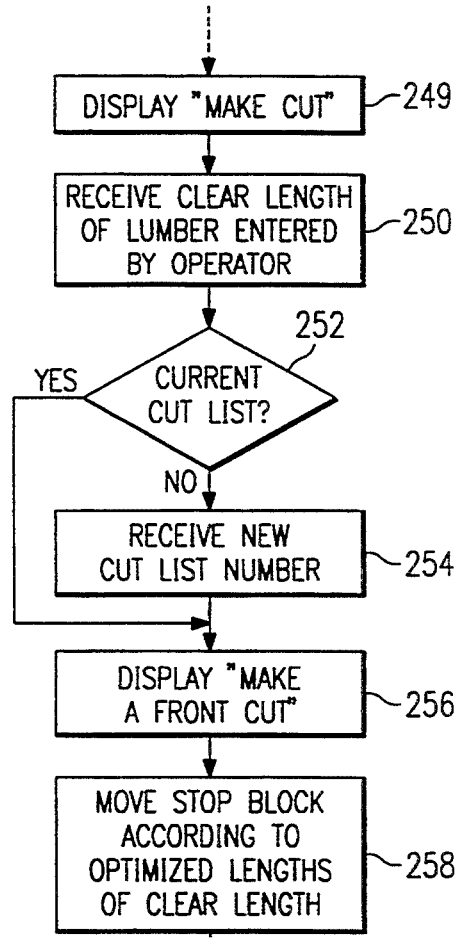
FIG. 4 is a flow chart depicting the computer operation in performing sawing operations between two cut lists.

With reference now to FIG. 4, there is illustrated a flow chart depicting programmed operations for allowing an operator to cut a piece of lumber according to different cut lists. These operations can be integrated into the regular programmed functions of the sawing system. According to the programmed operations of FIG. 4, two clear lengths of a single piece of lumber, which clear lengths may or may not be separated by a defect, can be cut according two cutting lists. The operator may even consider one clear length of a board as two different clear lengths by entering two dimensions, and saw the board according to two cutting lists. In any event, and as noted by program block 250, the computer receives from the operator a dimension corresponding to what the operator considers as a clear length of the lumber. As noted in program decision block 252, the computer 34 determines the last cut list that was made active by the operator, and optimizes the cuts from the entered clear length according to that cut list. If, on the other hand, the operator has entered a new cut list number, than the optimization takes place according to the more recently entered cut list. The computer receipt of the new cut list number is shown in program flow block 254. In this manner, each new entry by the operator of a defect-free length is associated with a cut list that is either the active cut list or a new cut list. If a new cut list has been identified by the operator, the optimization is again carried out with the newly entered defect-free length and the newly identified cut list.

With reference to program flow block 256, the computer 34 prompts the operator to make a leading trim or front cut. This is an instruction to the operator of the sawing system to square the end of the lumber with a fresh cut.

In program flow block 258, the computer 34 optimizes the entered clear length, and moves the stop block 44 to a first position for making the first cut, and thereafter moves the stop block 44 for all subsequent cuts to complete cutting of that entered clear length. In other words, the operations of program flow block 258 are repeated until the clear length of the board is completely cut according to the optimizing technique. When the clear length has been cut, program flow returns to block 249, where the operator is again prompted to make a cut by removing the knot and then enter the next or remaining clear length of that piece of lumber, or a clear length of a new piece of lumber. The operator can then enter a new cutting list number, if any, that is to be utilized in cutting the next clear length of the piece of lumber. On the other hand, if the knot is solid and conforms to a grade 2 type of quality, the operator can consider the knot as part of a clear length, enter such clear length into the computer, as well as a new cut list number for producing grade 2 types of boards. Hence, the term "defect-free length" as used herein can include defects that are acceptable for the specific grade being considered. The entering of a new cut list number corresponds to program flow chart 254.

With the operations noted above, the programmed computer 34 is completely unaware as to whether the operator is working on the next clear length of the same piece of lumber, or an entirely new piece of lumber. To that end, the reference to which the computer 34 makes cuts is to each clear length as designated by the operator, whether it is of the same or different piece of inventory lumber. Hence, if one piece of lumber includes three clear lengths, then three cutting lists can be employed. This enhanced versatility of the cutting system of the invention allows the operator a wide discretion of choices in which to complete a number of cutting jobs with the available stock lumber.

While the preferred embodiment of the invention has been disclosed with reference to particular sawing system enhancements, and methods of operation thereof, it is to be understood that many changes in detail may be made as a matter of engineering choices without departing from the spirit and scope of the invention, as defined by the appended claims.

What is claimed is:

1. A method of controlling a sawing system, comprising the steps of:
   storing a cut list in a computer;
   receiving by the computer via a manual input device, an indication of a defect-free length of a material to be cut;
   carrying out an optimizing algorithm using the cut list and the defect-free length to determine a manner in which to cut the defect-free length of the material;
   moving a stop block under control of the computer to establish a length of material to be cut according to the determination resulting from the optimizing algorithm; and
   detecting manual movement of a saw to cut a length of material as determined by the position of the stop block.

2. The method of claim 1, further including providing a visual prompt to an operator to manually operate the saw to cut the material.

3. The method of claim 1, further including providing a visual prompt to an operator to input via the manual input device the indication of a defect-free length of the material.

4. The method of claim 1, further including storing at least two cut lists in said computer and receiving indications via said manual input device for carrying out cutting operations using both said cut lists.

5. The method of claim 4, further including receiving by a computer of the sawing system an identification of a new cut list, and optimizing cutting lengths of the material according to the new cut list.

6. The method of claim 5, further including optimizing the new cut list and a defect-free length entered via the manual input device.

7. The method of claim 1, further including receiving plural defect-free lengths and plural identifications of different cut lists by a computer of the sawing system for a single length of the material to be cut, and carrying out different optimizing steps for each cut list by the computer, thereby cutting the length of material to be cut according to the different cut lists.

8. The method of claim 7, further including optimizing entered defect-free lengths according to a most current cut list, and on detecting an input of an identification of a new cut list by an operator of the system, optimizing subsequently entered defect-free lengths according to the new cut list.

9. The method of claim 1, further including updating a cut table stored in the computer after each cutting stroke of the saw as determined by the detecting step to determine an extent of completion of the cutting list.

10. A method of controlling a sawing system, comprising the steps of:
    providing a programmed computer for controlling movement of a stop block of the sawing system;
    programming the computer to receive and store plural cut lists for defining specified lengths and numbers of pieces of material to be cut by the sawing system;
    programming the computer to receive clear lengths of the material to be cut according to one or more of the stored cut lists; and.
    programming the computer to operate with the plural cut lists and to maintain concurrent optimizations of the plural cut lists, and to respond to a receipt of a clean length of material and to an identification of a cut list to carry out an optimization according to the cut list associated with said identification.

11. The method of claim 10, further including programming the computer to optimize cutting lengths according to clear lengths of the material and not to overall lengths of the material.

12. The method of claim 11, further including programming the computer to carry out optimizing steps of plural cutting lists during cutting of a single overall length of the material.

13. The method of claim 10, further including programming the computer to carry out an optimizing algorithm each time a cut list identification is entered into the computer by an operator of the system.

14. The method of claim 13, further including programming the computer to receive a cut list identification at any time after a saw stroke has been carried out to optimize cutting of a subsequently entered clear length of the material.

15. The method of claim 11, further including programming the computer to optimize a clear length of material each time an identification of a new cut list is received by the computer.

16. A method of controlling a sawing system, comprising the steps of:

receiving by a computer of the sawing system an identification of a cut list for cutting a piece of material into individual lengths of the material;

prompting an operator of the sawing system to enter a length of the material to be processed by the sawing system;

in response to the entered length, carrying out an optimizing algorithm by the computer using the cut list and the entered length;

moving a stop block a predetermined distance from a cutting device as a result of the optimizing step;

prompting the operator to move the material against the stop block and carry out a sawing operation on the material;

detecting the carrying out of a manual saw cut and prompting the operator to enter a new length of the material to be processed and whether or not the new length is to be optimized according to the cut list or a new cut list; and if an identification of a cut list is entered by the operator, optimizing the new length by the new cut list.

17. The method of claim 16, wherein plural optimizing steps are carried out during cutting of the piece of material.

18. The method of claim 16, further including prompting the operator to input information into the computer each time a length of material is entered for associating the length of material with a cut list.

* * * * *